(12) United States Patent
Pietron et al.

(10) Patent No.: US 9,657,809 B2
(45) Date of Patent: *May 23, 2017

(54) PENDULUM-ABSORBER BRAKE

(71) Applicant: Ford Global Technologies, LLC, Dearborn, MI (US)

(72) Inventors: Gregory Michael Pietron, Canton, MI (US); Jeffrey Eliot Chottiner, Farmington Hills, MI (US); John Edward Brevick, Livonia, MI (US); Matthew David Hammond, Dearborn, MI (US); Rick L. Williams, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/699,947

(22) Filed: Apr. 29, 2015

(65) Prior Publication Data

US 2015/0240913 A1 Aug. 27, 2015

Related U.S. Application Data

(62) Division of application No. 13/742,856, filed on Jan. 16, 2013, now Pat. No. 9,068,617.

(51) Int. Cl.
| | |
|---|---|
| F16F 15/14 | (2006.01) |
| F16F 7/10 | (2006.01) |
| F16D 59/00 | (2006.01) |
| F16F 15/28 | (2006.01) |

(52) U.S. Cl.
CPC ............ F16F 15/283 (2013.01); F16D 59/00 (2013.01); F16F 7/1005 (2013.01); Y10T 74/2128 (2015.01); Y10T 74/2184 (2015.01)

(58) Field of Classification Search
CPC ... F16F 7/1005; F16F 15/283; Y10T 74/2128; Y10T 74/2184; F16D 59/00
See application file for complete search history.

(56) References Cited

U.S. PATENT DOCUMENTS

| | | | |
|---|---|---|---|
| 2,367,709 A | 1/1945 | Arkus-Duntov et al. | |
| 4,739,679 A | 4/1988 | Berger et al. | |
| 5,201,287 A | 4/1993 | Blish | |
| 6,102,144 A | 8/2000 | Lutz | |
| 6,688,272 B2 * | 2/2004 | Brevick | F02B 75/22 |
| | | | 123/192.2 |
| 7,335,107 B2 | 2/2008 | Brosowske | |
| 7,438,165 B2 | 10/2008 | Nerubenko | |
| 7,464,800 B2 | 12/2008 | Nerubenko | |
| 8,813,604 B2 | 8/2014 | Geist et al. | |
| 8,813,605 B2 | 8/2014 | Wakeman | |
| 9,004,022 B2 * | 4/2015 | Williams | F16C 3/10 |
| | | | 123/197.4 |
| 9,032,837 B2 * | 5/2015 | Klotz | F16F 15/145 |
| | | | 74/574.2 |

(Continued)

*Primary Examiner* — Adam D Rogers
(74) *Attorney, Agent, or Firm* — Greg Brown; McCoy Russell LLP

(57) ABSTRACT

A crankshaft comprising a cheek, a torsion-absorbing pendulum pivotally coupled to the cheek, and a rotational speed actuated brake to oppose motion of the pendulum relative to the cheek. The brake is configured to provide greater opposition to the motion at lower rotational speeds than at higher rotational speeds.

11 Claims, 9 Drawing Sheets

(56) References Cited

U.S. PATENT DOCUMENTS

| | | | |
|---|---|---|---|
| 9,322,454 B2 * | 4/2016 | Glanfield | F16F 15/286 |
| 2005/0205271 A1 | 9/2005 | Prado | |
| 2006/0046859 A1 | 3/2006 | Brosowske | |
| 2006/0081432 A1 | 4/2006 | Nerubenko | |
| 2011/0031058 A1 | 2/2011 | Klotz et al. | |
| 2011/0207106 A1 | 8/2011 | Pacheco | |
| 2015/0047461 A1 * | 2/2015 | Glanfield | F16C 3/20 |
| | | | 74/604 |
| 2015/0369334 A1 * | 12/2015 | Dinger | F16F 15/145 |
| | | | 74/574.2 |
| 2016/0146289 A1 * | 5/2016 | Britton | F16F 15/283 |
| | | | 74/574.2 |

\* cited by examiner

PENDULUM-ABSORBER BRAKE

CROSS REFERENCE TO RELATED APPLICATIONS

The present application is a divisional of U.S. patent application Ser. No. 13/742,856, entitled "PENDULUM-ABSORBER BRAKE," filed on Jan. 16, 2013, the entire contents of which are hereby incorporated by reference for all purposes.

TECHNICAL FIELD

This application relates to the field of motor-vehicle engineering, and more particularly, to reducing crankshaft noise and wear in engines having a pendulum-absorber type crankshaft.

BACKGROUND AND SUMMARY

In an internal combustion engine, a crankshaft may be used to convert the reciprocating motion of the pistons into rotational motion. The crankshaft may include, offset from its rotational axis, a plurality of crankpins. Each crankpin is coupled through a bearing to a piston rod, which is linked to a corresponding piston. The crankshaft itself is supported by two or more main bearings, in which it rotates.

To prevent excessive vibration while rotating, the crankshaft may include a series of counterweights that counterbalance the mass of each crankpin, associated piston, piston rod, and entrained lubricant. The counterweights may prevent excessive vibration of a crankshaft perpendicular to its rotational axis, but do not address the torsional vibration that may occur about the rotational axis. More specifically, each piston rod transmits a torsional impulse to its attached crankpin during the power stroke of the associated piston. With each torsional impulse received, the crankshaft twists slightly about its rotational axis, then twists back after the power stroke. In this manner, periodic torsional impulses from each of the piston rods may drive a complex torsional vibration in the crankshaft. Depending on conditions, such vibration may coincide with an order of a natural resonance frequency of the crankshaft. When this occurs, the vibration may increase in amplitude, such that the crankshaft is inelastically deformed, causing material failure.

Certain crankshaft components may be used to suppress torsional vibration and thereby protect the crankshaft from failure—flywheels and torsional dampeners, for example. Another approach is to install one or more so-called 'pendulum absorbers' on the crankshaft. A pendulum absorber is a mass non-rigidly linked to the crankshaft at a predetermined distance from the rotational axis of the crankshaft. It reduces torsional stress in the crankshaft by absorbing one or more crankshaft firing-order rigid-body modes. When the crankshaft receives a torsional impulse at a crankpin, that impulse is partly absorbed in accelerating the mass of the pendulum absorber in the direction of the impulse. Likewise, when the crankshaft relaxes after the impulse, the relaxation is opposed by the inertia of the mass that was accelerated. In order to absorb the rigid-body modes of a crankshaft, a pendulum absorber may be 'tuned' by adjustment of its mass and of the distance between its center-of-mass and the rotational axis of the crankshaft. The pendulum absorber may also be tuned via the configuration of its travel path and/or the size of the fulcrum pins that are guided through the travel path.

To provide torsional vibration absorption, a pendulum absorber requires some running clearance between its travel path and one or more slide pins rigidly coupled to the cheek. The inventors herein have observed, however, that during periods of very slow crankshaft rotation—such as engine start or stop—a pendulum absorber may emit an undesirable clunking sound when travelling across the clearance. In other speed/torque regimes, a pendulum absorber may bang against the end-stops at the limits of its intended travel path, also emitting an undesirable sound. In some cases, premature wear of the crankshaft may occur along with the undesirable sound emission.

Some measures have been reported to address the issues identified above. For example, U.S. Patent Application Publication 2011/0031058 to Klotz et al. provides a travel limiter for a pendulum absorber, which is made of an elastomeric material. U.S. Pat. No. 4,739,679 to Berger et al. provides a special caming configuration in addition to elastomeric travel limiters. The inventors herein have observed, however, that elastomeric travel limiters may require frequent replacement when used in a modern motor-vehicle crankshaft. Moreover, the caming configuration of Berger may not fully resolve the noise issues observed at low rotational speeds.

Accordingly, this disclosure provides a series of solutions to address noise and wear of a pendulum-absorber type crankshaft of a motor-vehicle engine. One embodiment is a crankshaft comprising a cheek, a torsion-absorbing pendulum pivotally coupled to the cheek, and a rotational speed actuated brake to oppose motion of the pendulum relative to the cheek. The brake is configured to provide greater opposition to the motion at lower rotational speeds than at higher rotational speeds. In this manner, the greatest braking force becomes available at the lowest rotational speeds—e.g., during engine start or stop—when the pendulum absorber is apt to travel across its clearance, emitting undesirable sound. It will be noted that some of the configurations disclosed herein may also be used for transmission damper pendulum systems.

The summary above is provided to introduce a selected part of this disclosure in simplified form, not to identify key or essential features. The claimed subject matter, defined by the claims, is limited neither to the content of this summary nor to implementations that address the problems or disadvantages noted herein.

DETAILED DESCRIPTION

Figure 1:
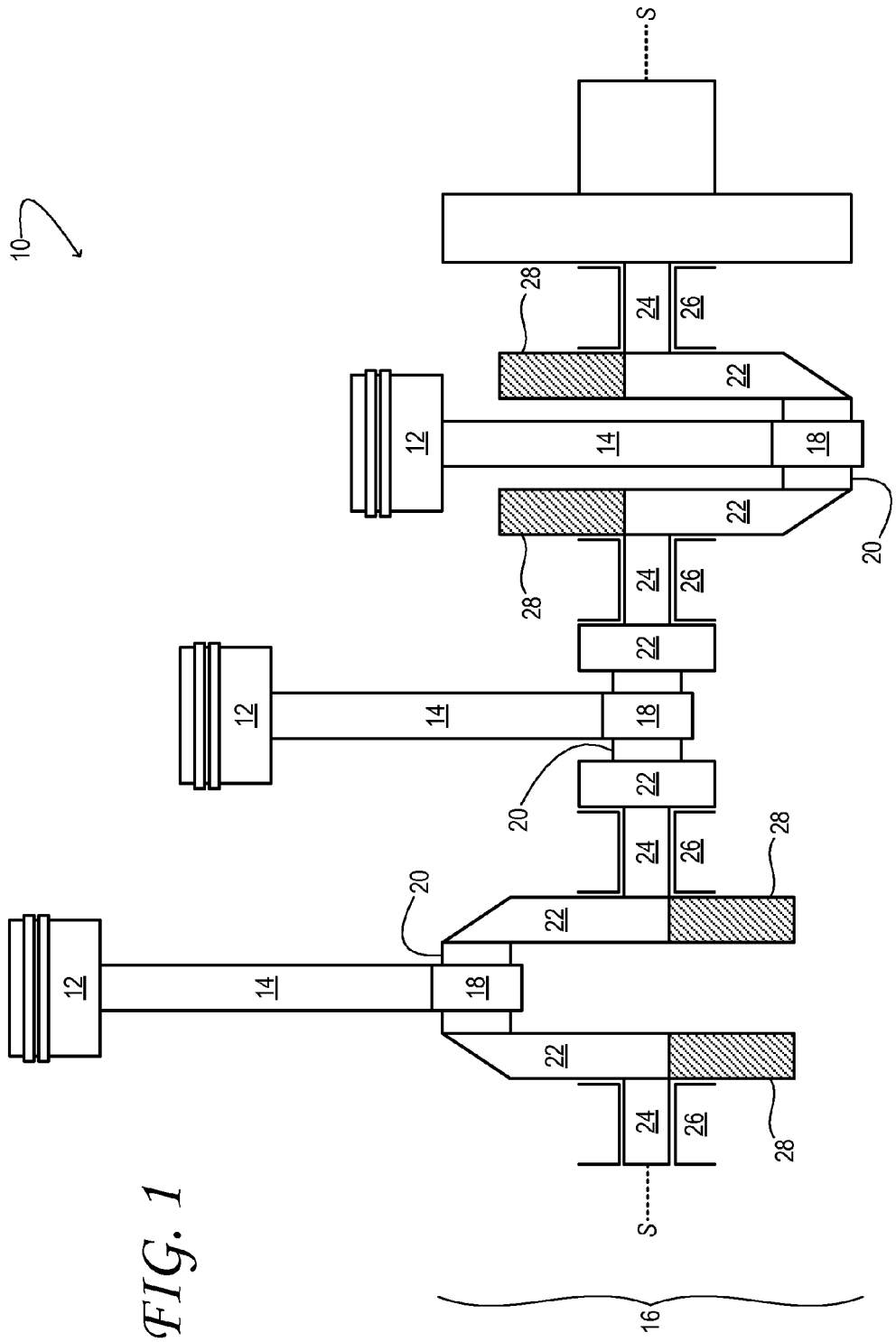
FIG. 1 schematically shows aspects of an example motor-vehicle engine in accordance with an embodiment of this disclosure.

FIG. 1 schematically shows aspects of an example engine 10 of a motor vehicle. The engine includes a plurality of reciprocating pistons 12. Although three pistons are shown in FIG. 1, this disclosure is equally applicable to engines having more or fewer pistons. Each piston is pivotally coupled to one end of a corresponding piston rod 14. The other end of each piston rod is pivotally coupled to crankshaft 16 through a rod bearing 18. More specifically, a cylindrical crankpin journal—crankpin 20, hereinafter—is rotationally coupled inside each rod bearing. Each crankpin is located between a pair of cheeks 22, and coupled to the same. In the embodiment of FIG. 1, adjacent pairs of cheeks are connected by a plurality main journals 24. The main journals are rotationally coupled inside a corresponding plurality of main bearings 26.

Crankshaft 16 includes a plurality of pendulum absorbers—pendula 28, hereinafter—which provide torsional-vibration absorption for the crankshaft. Each pendulum may have a predetermined mass; it may be connected at a predetermined distance from the rotation axis of the crankshaft, so as to absorb torsional vibration of a predetermined order in the rotating crankshaft. More specifically, the mass M of each pendulum and the distance L between the center-of-mass of the pendulum and the rotational axis S of the crankshaft may be adjusted in order to provide vibration absorption at any chosen order—e.g., an integer or half-integer order torsional deflection of the crankshaft.

Figure 2:
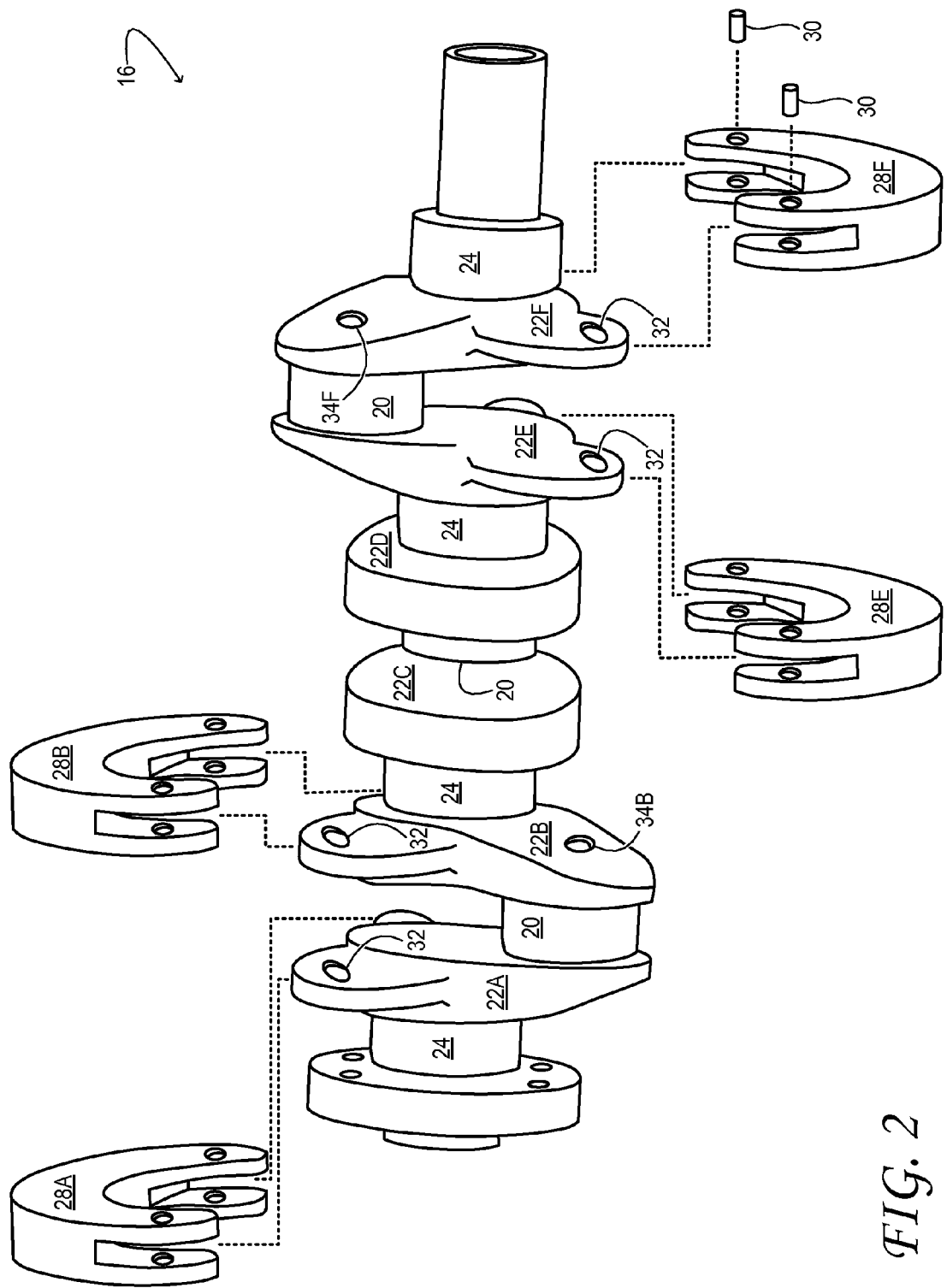
FIGS. 2 and 3 shows aspects of an example crankshaft in accordance with an embodiment of this disclosure.

FIG. 2 provides a more detailed view of crankshaft 16 in one embodiment. Here, each torsional-vibration absorbing pendulum 28 is a bifilar pendulum. In the illustrated embodiment, pendula 28A, 28B, 28E, and 28F are pivotally connected to corresponding cheeks 22, each with a pair of hardened fulcrum pins 30. Held in place by suitable retaining componentry (not shown in the drawings), the fulcrum pins move within loose-fitting bushings 32 on the attached cheek, allowing the pendulum to move with respect to the cheek in directions perpendicular to the rotational axis of the crankshaft. Such motion allows each pendulum to absorb torsional vibration at the order to which it is tuned. Further tuning may be achieved by adjusting the configuration of the travel path of the pendulum absorber and/or the size of the fulcrum pins that are guided through the travel path.

Pendula 28 may serve a double purpose in engine 10. In addition to providing torsional-vibration absorption, these pendula may counterbalance the mass of crankpins 20, piston rods 14, pistons 12, and the entrained lubricant. In the illustrated embodiment, additional counterbalancing is provided by cheeks 22C and 22D, which do not include pendula, but may be counterweighted. Further discussion about pendulum absorbers, including example structure and operation, is provided in U.S. Pat. No. 6,688,272 B2, which is hereby incorporated by reference herein.

Figure 3:
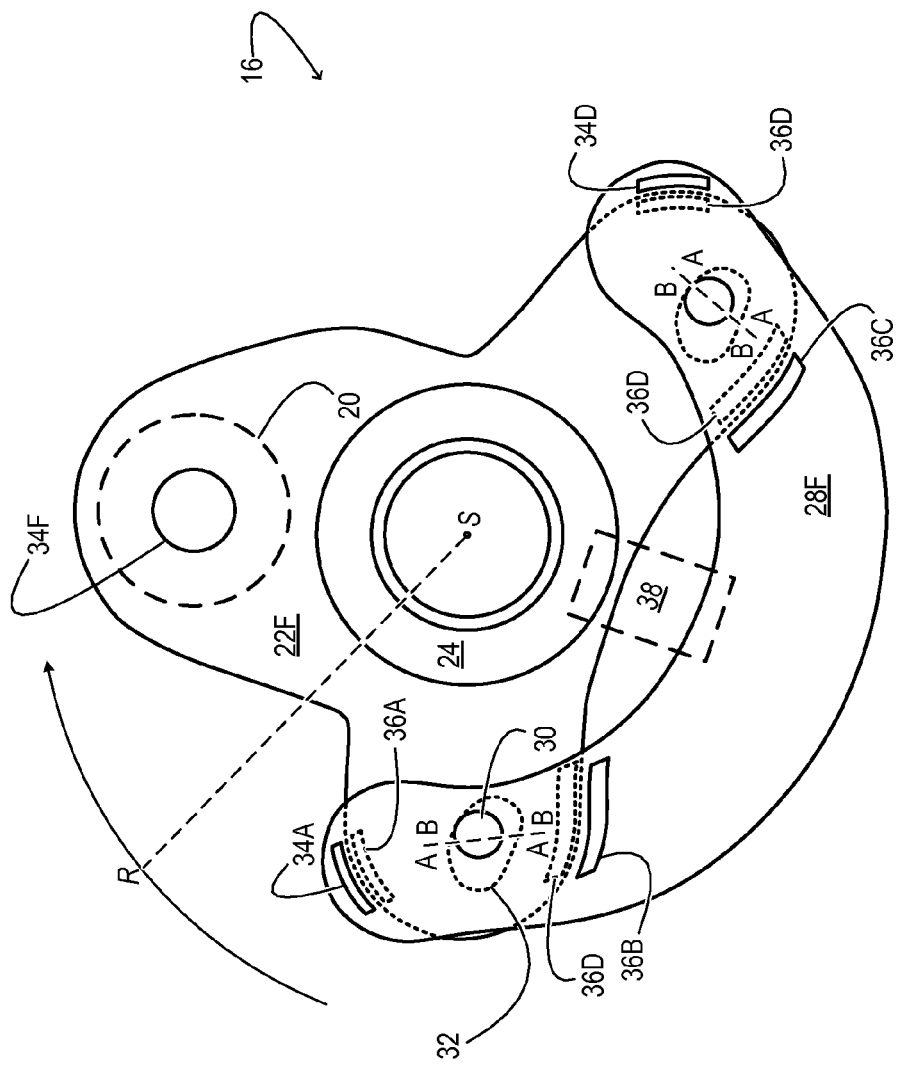

FIG. 3 provides a head-on view of crankshaft 16, showing the pivotal coupling of pendulum 28F to cheek 22F in one example embodiment. In the illustrated embodiment, the pendulum includes noise-suppression pads 34A through 34D, which are positioned to slide onto contact regions 36A through 36D, respectively, of the cheek. The noise-suppression pads are arranged to coincide with the contacting regions to impart increased sliding friction when the pendulum approaches its intended travel limits. In one embodiment, the noise-suppression pads may include material similar to transmission friction material. They may include an elastomer, such as rubber, pressed into a recess in the pendulum or trapped by the two halves of the pendulum. In an alternative embodiment, the noise suppression pads may be arranged on the cheek, and the contact regions arranged on the pendulum.

Figure 4:
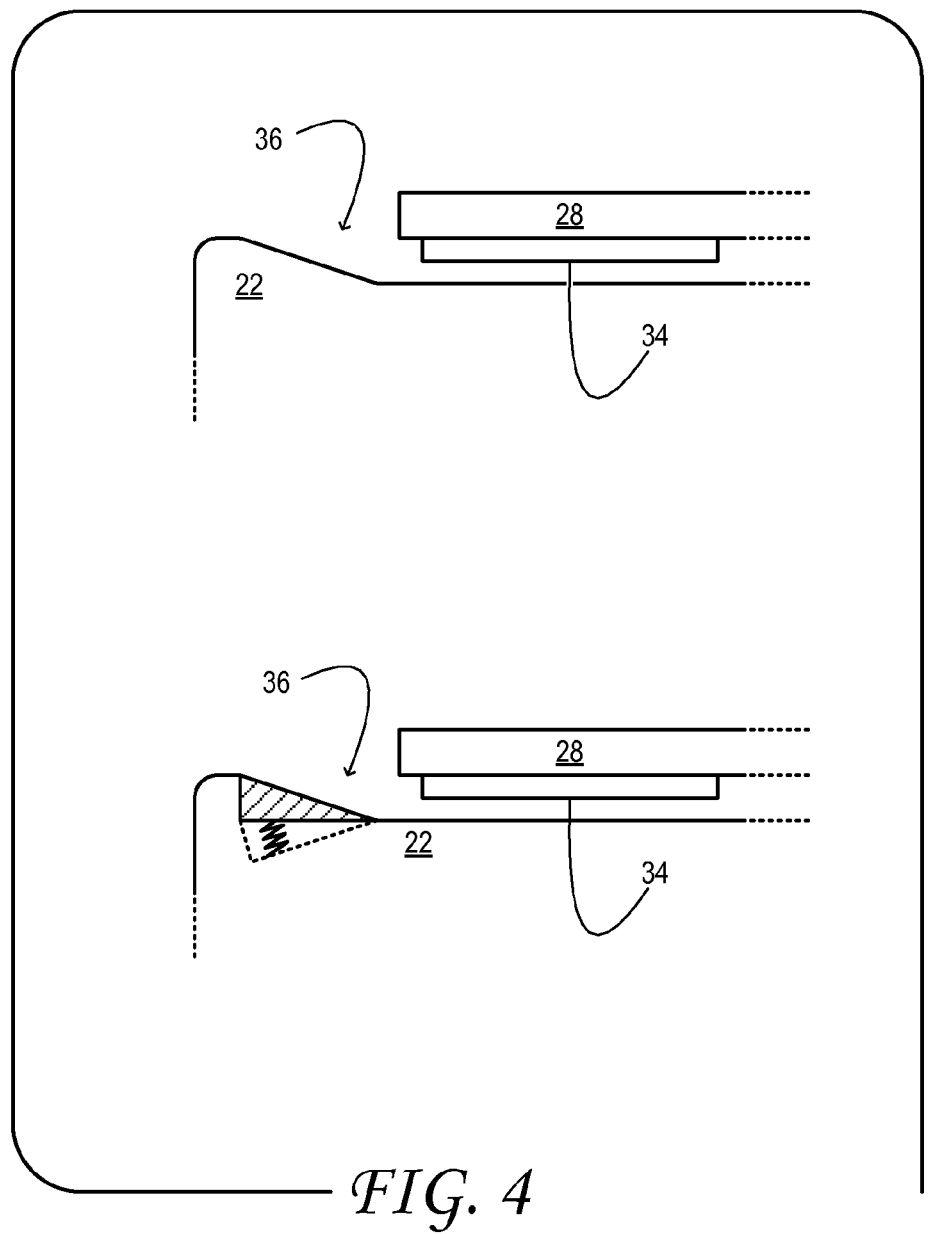
FIG. 4 shows aspects of example noise-suppression pads and contacting regions for a pendulum absorber in accordance with embodiments of this disclosure.

Contacting regions 36 of any cheek 22 may be sloped or wedge shaped—e.g., sloping toward the noise-suppression pads 34 of an associated pendulum 28 at a travel limit of the pendulum. The clearance between the pendulum and the cheek is therefore reduced as the pendulum reaches its angular limit. In this manner, the interfacial area between the pendulum and the cheek may be configured to impart increased sliding friction at the travel limits of the pendulum. In other embodiments, the contacting region may include a spring-loaded wedge-shaped shoe to provide increased braking force as the pendulum travels to its angular limit. The brake force may be set at a level that is easily overcome during operation, but stops the pendulum at very high travel. Aspects of these variants are shown by example in FIG. 4.

Returning now to FIG. 3, centrifugal force from the rapidly spinning crankshaft pulls the pendulum outward, away from rotation axis S. This action causes fulcrum pin 30 to ride along on the side of the bearing opposite the rotation axis—indicated as side A in FIG. 3. During periods of low rotational speed however, such force may not be sufficient to keep the fulcrum pin on side A. When the pendulum is carried above the rotation axis, for example, gravity may cause it to fall downward such that the fulcrum pin crosses over to side B. Then, when the pendulum is carried back below the rotation axis, it may fall downward again, crossing back to side A. Each crossing can give rise to a clunking noise, and contribute to premature wear of the pendulum, the cheek, and the fulcrum pin.

Accordingly, cheeks 22A, 22B, 22E, and/or 22F (in general, any cheek that supports a pendulum) may further include a rotational speed actuated brake 38. The brake may be configured to oppose motion of the pendulum relative to the cheek. In some embodiments, the brake may be configured to provide greater opposition to the motion at lower rotational speeds than at higher rotational speeds, as further described below.

Figure 5:
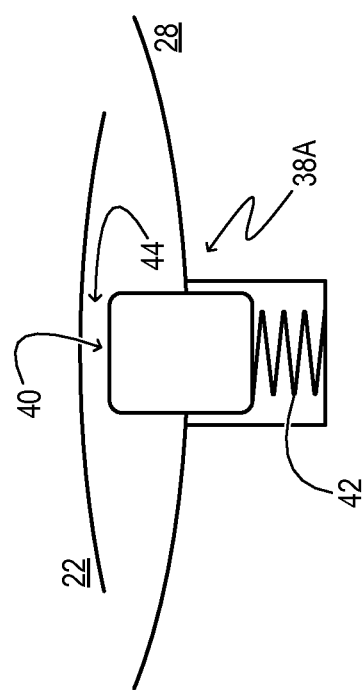

FIG. 5 shows aspects of an example rotational speed actuated brake 38A in one embodiment. Brake 38A includes shoe 40 and spring 42. In the embodiment of FIG. 5, both the shoe and the spring are coupled to pendulum 28. More particularly, the shoe is slidably coupled within a recess formed in the pendulum, which also confines the spring. As such, the shoe is extendable into the clearance 44 between the pendulum and associated cheek 22. The shoe is configured to oppose the motion of the pendulum relative to the cheek by bridging the clearance to contact the portion of the cheek that opposes the shoe. The spring is configured to push the shoe out into the clearance so that it contacts the cheek. However, the shoe is also arranged to retract from the clearance under centrifugal force from rotation of the crankshaft. The greater the rotational speed of the crankshaft, the more centrifugal force is brought to bear on the shoe; the greater the centrifugal force, the greater the compression of the spring and retraction of the shoe. In contrast, the lower the rotational speed of the crankshaft, the less centrifugal force is brought to bear on the shoe. As the centrifugal force diminishes, the spring can further extend the shoe into the clearance, providing the braking action that opposes the motion of the pendulum relative to the cheek.

Figure 6:
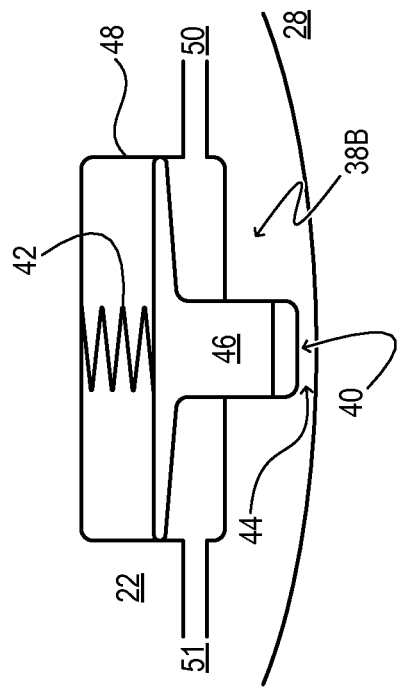
FIGS. 5 and 6 show aspects of rotational speed actuated pendulum brakes in accordance with embodiments of this disclosure.

FIG. 6 shows aspects of another example rotational speed actuated brake 38B in one embodiment. As in the previous embodiment, brake 38B includes shoe 40 and spring 42, which is configured to push the shoe out into clearance 44. In the embodiment of FIG. 6, however, both the shoe and the spring are coupled to cheek 22. Here, the brake further includes a piston 46 that telescopes into and partly out of a fluid-filled cylinder 48. In the embodiments contemplated herein, the piston may be integrated with or otherwise coupled to the shoe. The pressure within the cylinder is controlled via hydraulic lines 50 and 51, which may be hydraulic supply and return lines, respectively. As evident from the drawing, increased fluid pressure within the cylinder telescopes the piston back into the cylinder, opposing the action of the spring and retracting the shoe from the clearance. In other words, when the fluid pressure is low, the spring extends the shoe into the clearance to contact the pendulum and thereby oppose the motion of the pendulum with respect to the cheek. When the fluid pressure is high, the restoring force of the spring is overwhelmed, causing the shoe to retract so that less braking force is applied.

At least two modes of controlling the fluid pressure are contemplated. These modes will be described with reference to FIG. 7, which shows aspects of an example engine system 52B in which engine 10 may be installed. In engine system 52B, hydraulic pump 54 supplies hydraulic fluid to cylinder 48 of brake 38B. The hydraulic pump is driven by camshaft 56, which is mechanically coupled to crankshaft 16 via a belt, chain, or other suitable componentry. In other embodiments, the pump may be driven directly by the crankshaft. Accordingly, the hydraulic fluid is supplied at a higher pressure by the pump at higher rotational speeds of the crankshaft, and, at a lower pressure at lower rotational speeds of the crankshaft. In this manner, brake 38B may be set automatically (by spring 42, for example) at lower rotational speeds of the crankshaft, and released automatically (by hydraulic pressure) at higher rotational speeds.

Figure 7:
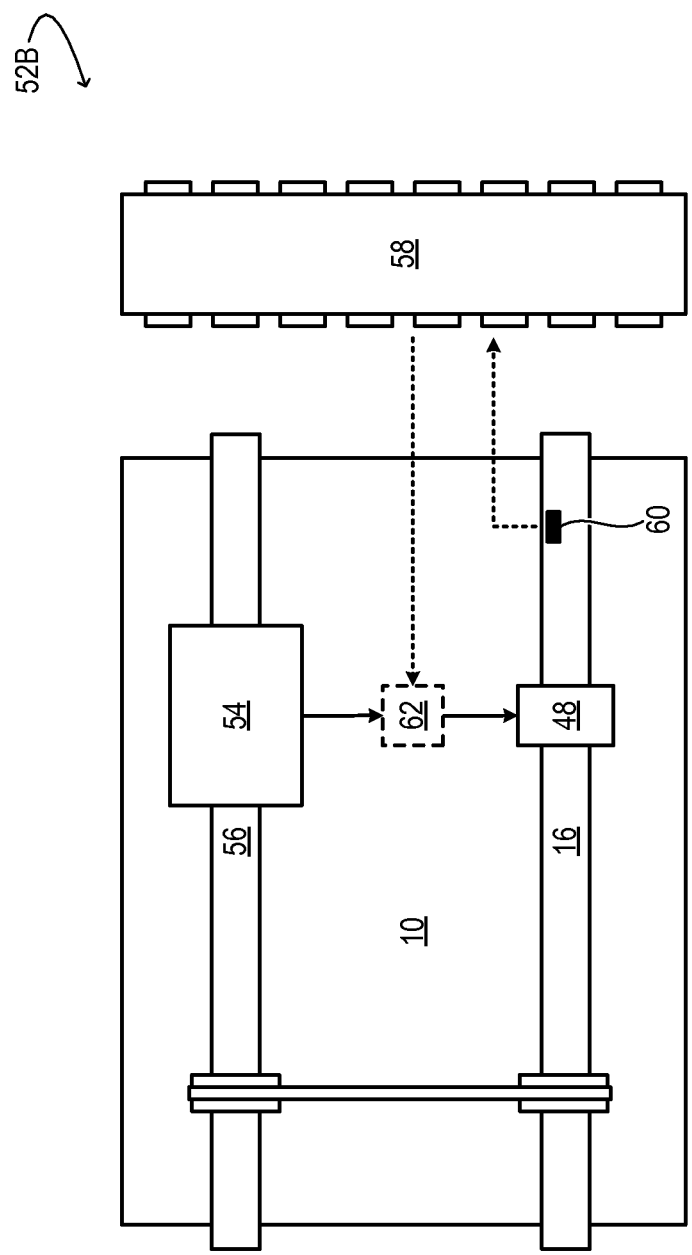
FIG. 7 shows aspects of an example engine system in accordance with an embodiment of this disclosure.

In an alternative embodiment, also described with reference to FIG. 7, an electronic control unit 58 of engine system 52 receives a signal from rotational speed sensing element 60. The rotational speed sensing element may be any component that generates a signal responsive to the rotational speed of crankshaft 16. From the frequency or magnitude of the signal, the controller determines the rotational speed of the crankshaft. When the rotational speed exceeds a threshold, the controller opens a normally closed valve 62 disposed in the hydraulic line linking hydraulic pump 54 to cylinder 48 of brake 38B. In other words, the controller is configured to increase the fluid pressure when the sensing element reports that the rotational speed is below a threshold. This action sets the brake. When the sensing element reports that the rotational speed is above the threshold, the controller decreases the fluid pressure, which releases the brake. The controller is configured, accordingly, to cause the brake to increase opposition to the motion of the pendulum with respect to the cheek as the rotational speed decreases, and, to decrease the opposition to the motion as the rotational speed increases.

Figure 8:
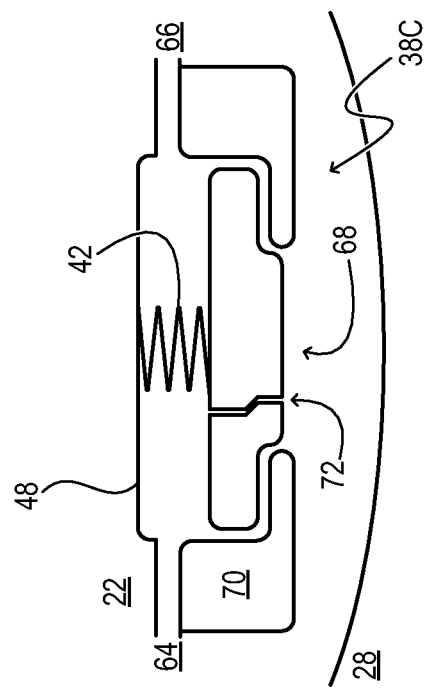

FIG. 8 shows aspects of another rotational speed actuated brake 38C in one embodiment. Unlike the forgoing embodiments, which include a solid brake shoe, brake 38C includes a valve configured to release, when open, a lubricant jet to oppose the motion of pendulum 28 relative to cheek 22. The valve is further configured to cut off the lubricant jet when closed, thereby reducing the braking force. To this end, the valve is coupled to a lubricant-filled cylinder 48 that receives engine lubricant from supply line 64 and releases the lubricant via return line 66. The valve includes a stopper 68 and a seat 70 to receive the stopper. In the embodiment shown in FIG. 8, brake 38C further includes a spring 42 coupled to the stopper and configured to pull the stopper away from the seat. The stopper is arranged to be forced into the seat under centrifugal force from rotation of the crankshaft. In this embodiment, the centrifugal force pulls against the restoring force of the spring. Accordingly, the lubricant jet is released only at low rotational speeds of the crankshaft, where the centrifugal force acting on the stopper cannot overcome the restoring force of the spring. At higher rotational speeds, the centrifugal force overcomes the restoring force, seating the stopper and cutting off the lubricant jet. As shown in the drawing, the stopper may include an optional low-flow passage 72 that remains open whether the stopper is seated or unseated, to provide baseline lubrication to pendulum 28.

Figure 9:
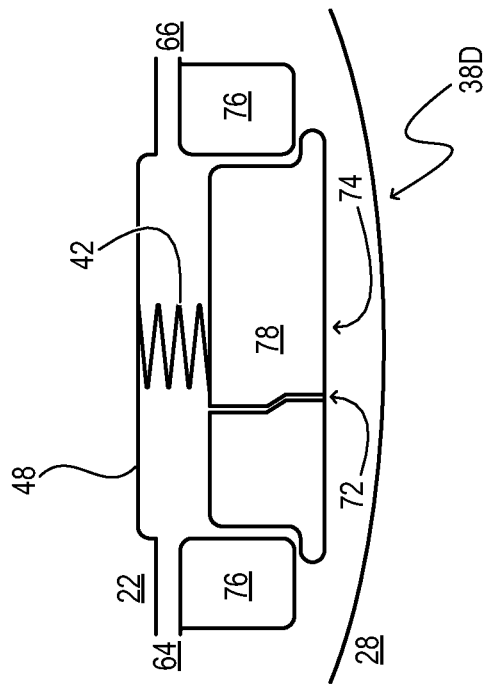
FIGS. 8 and 9 show aspects of other rotational speed actuated pendulum brakes in accordance with embodiments of this disclosure.

FIG. 9 shows aspects of yet another rotational speed actuated brake 38D in one embodiment. Like brake 38C of the foregoing embodiment, brake 38D includes a valve configured to release, when open, a lubricant jet to oppose the motion of pendulum 28 relative to cheek 22, and to cut off the lubricant jet when closed. In this brake, however, spring 42 is configured to pull stopper 74 into seat 76. Piston 78 is integrated with or coupled to the stopper. The piston telescopes into and partly out of fluid-filled cylinder 48. As in the foregoing embodiment, fluid-filled cylinder 48 may be filled with engine lubricant. Increased fluid pressure within the cylinder telescopes the piston partly out of the cylinder, unseating the stopper, and allowing the lubricant jet to flow at an increased rate for increased braking.

Figure 10:
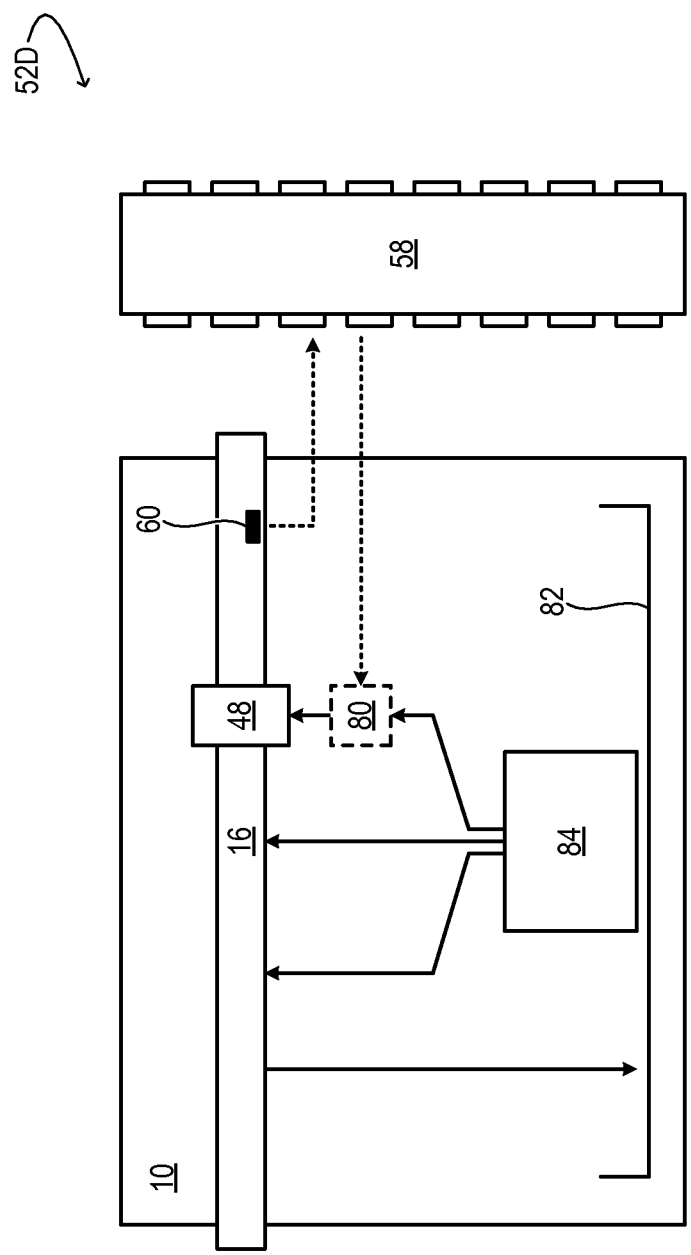
FIG. 10 shows aspects of another example engine system in accordance with an embodiment of this disclosure.

An example mode of operation of brake 38D will now be described with reference to FIG. 10. This drawing shows aspects of another example engine system 52D, in which engine 10 may be installed. In engine system 52D, crankshaft 16 rotates above oil pan 82, which receives and collects lubricant oil discharged from the various oilways of the crankshaft. Oil pump 84 suctions the collected lubricant oil and pumps it back to the oilways for continuous, active lubrication of the crankshaft. The oil pump also pumps the lubricant oil to cylinder 48 of brake 38D, through valve 80. The controller may be configured to open the valve to increase the lubricant pressure in the cylinder when the sensing element reports that the rotational speed is below a threshold. When the sensing element reports that the rotational speed is above the threshold, the controller may be configured to close the valve to reduce the lubricant pressure in the cylinder. In that event, spring 42 reseats stopper 86, which cuts off the lubricant jet for reduced braking force.

The configurations described above enable various methods for reducing noise and wear of a pendulum-absorber crankshaft of a motor-vehicle engine. Accordingly, some such methods are now described, by way of example, with continued reference to the above configurations. It will be understood, however, that the methods here described, and others within the scope of this disclosure, may be enabled by different configurations as well.

Figure 11:
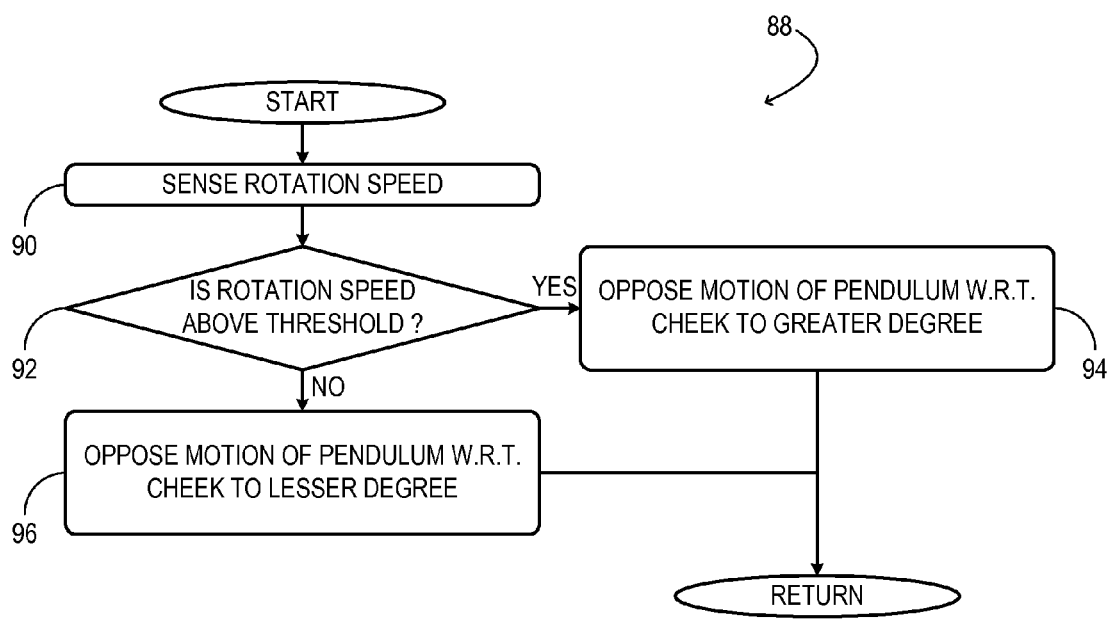
FIG. 11 illustrates an example method for reducing noise and wear of a pendulum-absorber crankshaft of a motor-vehicle engine.

FIG. 11 illustrates an example method 88 for reducing noise and wear of a pendulum-absorber crankshaft of a motor-vehicle engine. At 90 of the method, rotational speed is sensed. In one embodiment, the rotational speed may be sensed via a rotational speed sensing element coupled operatively coupled to an electronic control unit of the engine system, as indicated above. In other embodiments, the rotational speed may be sensed indirectly, via any suitable surrogate metric. At 92 it is determined whether the rotational speed is above a threshold. If the rotational speed is above the threshold, then the method advances to 94. However, if the rotational speed is not above the threshold, then the method advances to 96. At 94 the motion of the pendulum with respect to the cheek is opposed to greater degree—i.e., brake 38 is set. At 96 the motion of the pendulum with respect to the cheek is opposed to lesser degree—i.e., brake 38 is released.

Aspects of this disclosure are set forth by example, with reference to the illustrated embodiments described above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

In the methods illustrated and/or described herein, some of the indicated process steps may be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

It will be understood that the articles, systems, and methods described hereinabove are embodiments of this disclosure—non-limiting examples for which numerous variations and extensions are contemplated as well. This disclosure also includes all novel and non-obvious combinations and sub-combinations of the above articles, systems, and methods, and any and all equivalents thereof.

The invention claimed is:

1. A crankshaft comprising:
    a cheek;
    a torsion-absorbing pendulum pivotally coupled to the cheek with a fulcrum pin; and
    a rotational speed actuated brake including a valve configured to release, when open, a lubricant jet to oppose motion of the pendulum relative to the cheek and further configured to cut off the lubricant jet when closed, the brake configured to provide greater opposition to the motion at lower rotational speeds than at higher rotational speeds via the valve.

2. The crankshaft of claim 1, wherein the brake includes a shoe extendable to bridge a clearance between the cheek and the pendulum to oppose the motion of the pendulum relative to the cheek.

3. The crankshaft of claim 2, wherein the brake further includes a spring coupled to the shoe and configured to push the shoe out into the clearance.

4. The crankshaft of claim 3, wherein the spring and shoe are coupled to the pendulum.

5. The crankshaft of claim 3, wherein the spring and shoe are coupled to the cheek.

6. The crankshaft of claim 2, wherein the shoe is arranged to retract from the clearance under centrifugal force from rotation of the crankshaft.

7. The crankshaft of claim 2, wherein the brake further includes a piston that telescopes into and partly out of a fluid-filled cylinder, wherein the piston is coupled to the shoe, and wherein increased fluid pressure within the cylinder telescopes the piston back into the cylinder, retracting the shoe from the clearance.

8. An engine comprising:
    a crankshaft having a cheek, a torsion-absorbing pendulum pivotally coupled to the cheek, and a rotational speed actuated brake coupled between the cheek and the pendulum to oppose motion of the pendulum relative to the cheek;
    a rotational speed sensing element; and
    a controller operatively coupled to the brake and to the rotational speed sensing element and configured to cause the brake to increase opposition to the motion as rotational speed decreases and to decrease the opposition to the motion as the rotational speed increases.

9. The engine of claim 8, wherein the brake includes:
    a valve configured to release, when open, a lubricant jet to oppose the motion of the pendulum relative to the cheek, the valve further configured to cut off the lubricant jet when closed; and
    a piston that telescopes into and partly out of a fluid-filled cylinder, the piston being integrated with or coupled to a stopper;
    wherein increased fluid pressure within the cylinder telescopes the piston partly out of the cylinder, unseating the stopper; and
    wherein the controller is configured to increase the fluid pressure when the sensing element reports that the rotational speed is below a threshold.

10. A method to reduce noise and wear of a crankshaft of an engine system, the crankshaft including a cheek and a torsion-absorbing pendulum pivotally coupled to the cheek, the method comprising:
    at lower rotational speeds, opposing to a greater degree motion of the pendulum relative to the cheek by bridging a clearance between the cheek and the pendulum with a rotational speed actuated brake coupled between the cheek and the pendulum; and
    at higher rotational speeds, opposing to a lesser degree the motion of the pendulum relative to the cheek with the rotational speed actuated brake.

11. The method of claim 10, further comprising sensing the rotational speed.

* * * * *